United States Patent
Watanabe et al.

(10) Patent No.: US 11,407,104 B2
(45) Date of Patent: Aug. 9, 2022

(54) TOOTH CONTACT POSITION ADJUSTMENT AMOUNT ESTIMATION DEVICE, MACHINE LEARNING DEVICE, AND ROBOT SYSTEM

(71) Applicant: FANUC Corporation, Yamanashi (JP)

(72) Inventors: Shuusuke Watanabe, Yamanashi (JP); Shinji Mizokami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 193 days.

(21) Appl. No.: 16/504,334

(22) Filed: Jul. 8, 2019

(65) Prior Publication Data
US 2020/0016744 A1 Jan. 16, 2020

(30) Foreign Application Priority Data

Jul. 10, 2018 (JP) .............................. JP2018-131001
May 28, 2019 (JP) .............................. JP2019-099547

(51) Int. Cl.
*B25J 9/16* (2006.01)
*G05B 19/19* (2006.01)

(52) U.S. Cl.
CPC ............. *B25J 9/163* (2013.01); *B25J 9/1664* (2013.01); *G05B 19/19* (2013.01); *G05B 2219/45083* (2013.01)

(58) Field of Classification Search
CPC ........ B25J 9/1628; B25J 9/163; B25J 9/1656; B25J 9/1664; B25J 9/1679; B25J 9/1684;
(Continued)

(56) References Cited

U.S. PATENT DOCUMENTS 2,896,467 A * 7/1959 Saari .......................... F16H 1/12
74/459.5
9,976,631 B1 * 5/2018 Wittig ........................ F16H 1/32
(Continued)

FOREIGN PATENT DOCUMENTS

CN 105954021 A * 9/2016
DE 202017106132 U1 11/2017
(Continued)

*Primary Examiner* — Khoi H Tran
*Assistant Examiner* — Sarah A Tran
(74) *Attorney, Agent, or Firm* — Hauptman Ham, LLP

(57) ABSTRACT

A tooth contact position adjustment amount estimation device that performs processing with respect to estimating a tooth contact position adjustment amount for dimensional data of parts constituting a power transmission mechanism according to the present invention, comprising: a machine learning device that performs processing with respect to estimating the tooth contact position adjustment amount for the dimensional data of parts constituting the power transmission mechanism, wherein the machine learning device observes part dimensional data, which is the dimensional data of parts constituting the power transmission mechanism, as a state variable indicating a current state of an environment, and performs processing with respect to estimating the tooth contact position adjustment amount for the dimensional data of parts constituting the power transmission mechanism in assembling the power transmission mechanism by performing processing with respect to machine learning based on the observed state variable.

20 Claims, 11 Drawing Sheets

(58) Field of Classification Search
CPC ........ B25J 9/1692; G05B 19/00; G05B 19/19; G05B 2219/45083; G05B 2219/41054; G05B 2219/41077; G05B 2219/41059; G05B 2219/39191; G05B 2219/41358; G05B 2219/35022; G06N 20/00
See application file for complete search history.

(56) References Cited

U.S. PATENT DOCUMENTS

| | | | |
|---|---|---|---|
| 10,317,886 B1 * | 6/2019 | Arthur | G01B 11/24 |
| 2018/0120819 A1 | 5/2018 | Ishiwari | |
| 2018/0260720 A1 * | 9/2018 | Wu | G06N 5/04 |
| 2019/0232489 A1 | 8/2019 | Pascanu et al. | |

FOREIGN PATENT DOCUMENTS

| | | | |
|---|---|---|---|
| JP | H3163327 | A | 7/1991 |
| JP | H10252872 | A | 9/1998 |
| JP | 3586997 | B2 | 11/2004 |
| JP | 2013-160361 | A | 8/2013 |
| JP | 2016-142379 | A | 8/2016 |
| JP | 2016153931 | A | 8/2016 |
| JP | 2017123032 | A | 7/2017 |
| JP | 6261808 | B1 | 1/2018 |
| JP | 201873136 | A | 5/2018 |

* cited by examiner

FIG.4
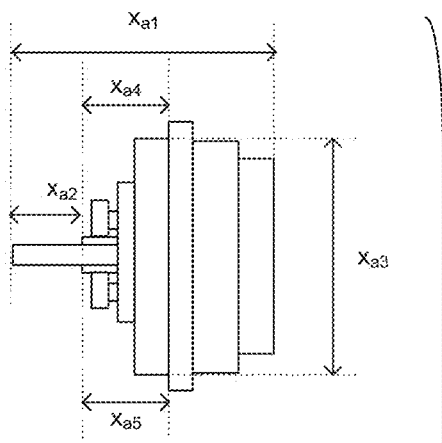
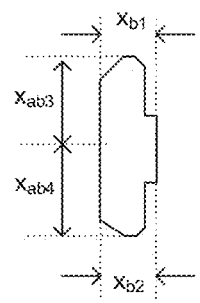
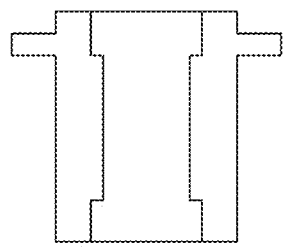
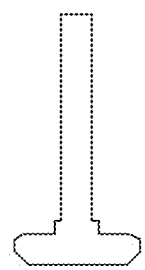
PART DIMENSIONAL DATA S1
$= (x_{a1}, x_{a2}, x_{a3}, \cdots, x_{b1}, x_{b2}, \cdots, x_{c1}, \cdots)$

TOOTH CONTACT POSITION ADJUSTMENT AMOUNT ESTIMATION DEVICE, MACHINE LEARNING DEVICE, AND ROBOT SYSTEM

RELATED APPLICATIONS

The present application claims priority to Japanese Patent Application Number 2018-131001 filed Jul. 10, 2018 and Japanese Patent Application Number 2019-99547 filed May 28, 2019, the disclosures of which are hereby incorporated by reference herein in their entirety.

BACKGROUND OF THE INVENTION

1. Field of the Invention

The present invention relates to a tooth contact position adjustment amount estimation device, a machine learning device, and a robot system. The present invention particularly relates to a tooth contact position adjustment amount estimation device, a machine learning device, and a robot system for estimating a tooth contact position adjustment amount of gears used in a structure for transmitting power via shafts the axial lines of which cross each other.

2. Description of the Related Art

A bevel gear is used in a structure for transmitting power via shafts the axial lines of which cross each other. A worm gear is used in a structure for transmitting power via shafts the axial lines of which are offset with each other. When the tooth contact of the gears, which are assembled on each shaft, and which mesh with each other, is not appropriate, abnormal noise, vibration, and abnormal wear of the teeth can occur. It is important to optimize the shape of the gears for appropriate tooth contact. The positions where the gears are assembled may be different with each other due to an error of dimensions of the parts assembled with the gears.

FIG. 6 is a diagram illustrating a gear structure using bevel gears. In FIG. 6, power on the input side is transmitted to the output side by the bevel gears the axial lines of which are arranged at right angle. The bevel gears are assembled on a reducer and a holder, respectively. The reducer or the holder is assembled to a casing. Thus, the tooth contact of the bevel gears changes due to a dimensional error of the assembled parts such as the bevel gears or the holder. For example, when the shaft assembled with the bevel gear on the input side is short in FIG. 6, the bevel gear on the input side and the bevel gear on the output side are different with each other in terms of their meshing position. In this case, there arises a problem that abnormal noise, vibration, or abnormal wear of the teeth occurs. In such a case, the tooth contact needs to be adjusted. A tooth contact position adjustment shim is inserted between the parts such as the gears or the holder in order to adjust the tooth contact (JP 2016-142379 A, JP 2013-160361 A).

The publication of Japanese Patent No. 3586997 discloses a technique for determining tooth contact adjustment in an image processing, for example, as a conventional technique for adjusting tooth contact between gears.

However, a dimensional variation is in the parts such as the gears or the holder. Thus, an optimum assembly position is different for each part. In the tooth contact adjustment method, the optimum tooth contact position adjustment amount (such as the thickness of shim or the number of shims) is finally determined by an experienced assembly worker. Thus, there is a problem that it takes much time for an unexperienced worker to determine the optimum tooth contact position adjustment amount.

Tooth contact between gears is evaluated by an image in JP 2016-142379 A, but tooth contact needs to be evaluated while the gears are actually assembled. When it is determined that the tooth contact position is not appropriate, a step of removing the assembled parts and inserting a shim is caused. Thus, productivity or work efficiency lowers in the technique disclosed in JP 2016-142379 A.

It is therefore an object of the present invention to provide a tooth contact position adjustment amount estimation device capable of determining the thickness or number of shims to be used before assembling a power transmission mechanism, a machine learning device, and a robot system.

SUMMARY OF THE INVENTION

A tooth contact position adjustment amount estimation device, a machine learning device, and a robot system according to the present invention solve at least some of the above problems. According to one embodiment of the present invention, machine learning is performed in which input data and output data corresponding to the input data are used as teaching data. The input data is dimensional data of parts such as gears constituting a structure for transmitting power via shafts the axial lines of which cross each other. The output data indicates the optimum tooth contact position adjustment amount when assembling the parts. A learned model acquired as a result of machine learning is used to estimate the tooth contact position adjustment amount from the part dimensional data. The thickness or number of shims is determined on the basis of the estimated tooth contact position adjustment amount. Thereby, the assembly position rearrangement step is alleviated and the assembly is efficiently performed.

According to one aspect of the present invention, there is provided a tooth contact position adjustment amount estimation device that performs processing with respect to estimating a tooth contact position adjustment amount for dimensional data of parts constituting a power transmission mechanism, comprising: a machine learning device that performs processing with respect to estimating the tooth contact position adjustment amount for dimensional data of parts constituting a power transmission mechanism, wherein the machine learning device observes part dimensional data, which is dimensional data of parts constituting the power transmission mechanism, as a state variable indicating a current state of an environment, and performs processing with respect to estimating the tooth contact position adjustment amount for dimensional data of parts constituting the power transmission mechanism in assembling the power transmission mechanism by performing processing with respect to machine learning based on the observed state variable.

According to another aspect of the present invention, there is provided a machine learning device that performs processing with respect to estimating a tooth contact position adjustment amount for dimensional data of parts constituting a power transmission mechanism, wherein the machine learning device observes part dimensional data, which is dimensional data of parts constituting the power transmission mechanism, as a state variable indicating a current state of an environment, and performs processing with respect to estimating the tooth contact position adjustment amount for dimensional data of parts constituting the power transmission mechanism in assembling the power transmission mechanism by performing processing with respect to machine learning based on the observed state variable.

According to another aspect of the present invention, there is provided a robot system including a controller that determines the number of shims used for assembling a power transmission mechanism and instructs a robot to assemble a determined number of shims on the parts on the basis of the tooth contact position adjustment amount estimated by the tooth contact position adjustment amount estimation device.

According to another aspect of the present invention, there is provided a tooth contact position adjustment amount estimation system in which a plurality of devices are connected to each other via a network, wherein the plurality of devices include at least one tooth contact position adjustment amount estimation device provided with a learning unit.

According to the present invention, the thickness or number of shims is previously determined on the basis of the estimated tooth contact position adjustment amount. Thus, loads on a worker in the assembly position rearrangement step are alleviated and the assembly is efficiently performed.

BRIEF DESCRIPTION OF THE DRAWINGS

The above and other objects and characteristics of the present invention will be apparent from the following description of embodiments with reference to the accompanying drawings:

FIG. 4 is a diagram illustrating exemplary part dimensional data;

DETAILED DESCRIPTION OF THE PREFERRED EMBODIMENTS

Embodiments of the present invention will be described below with reference to the drawings.

Figure 1:
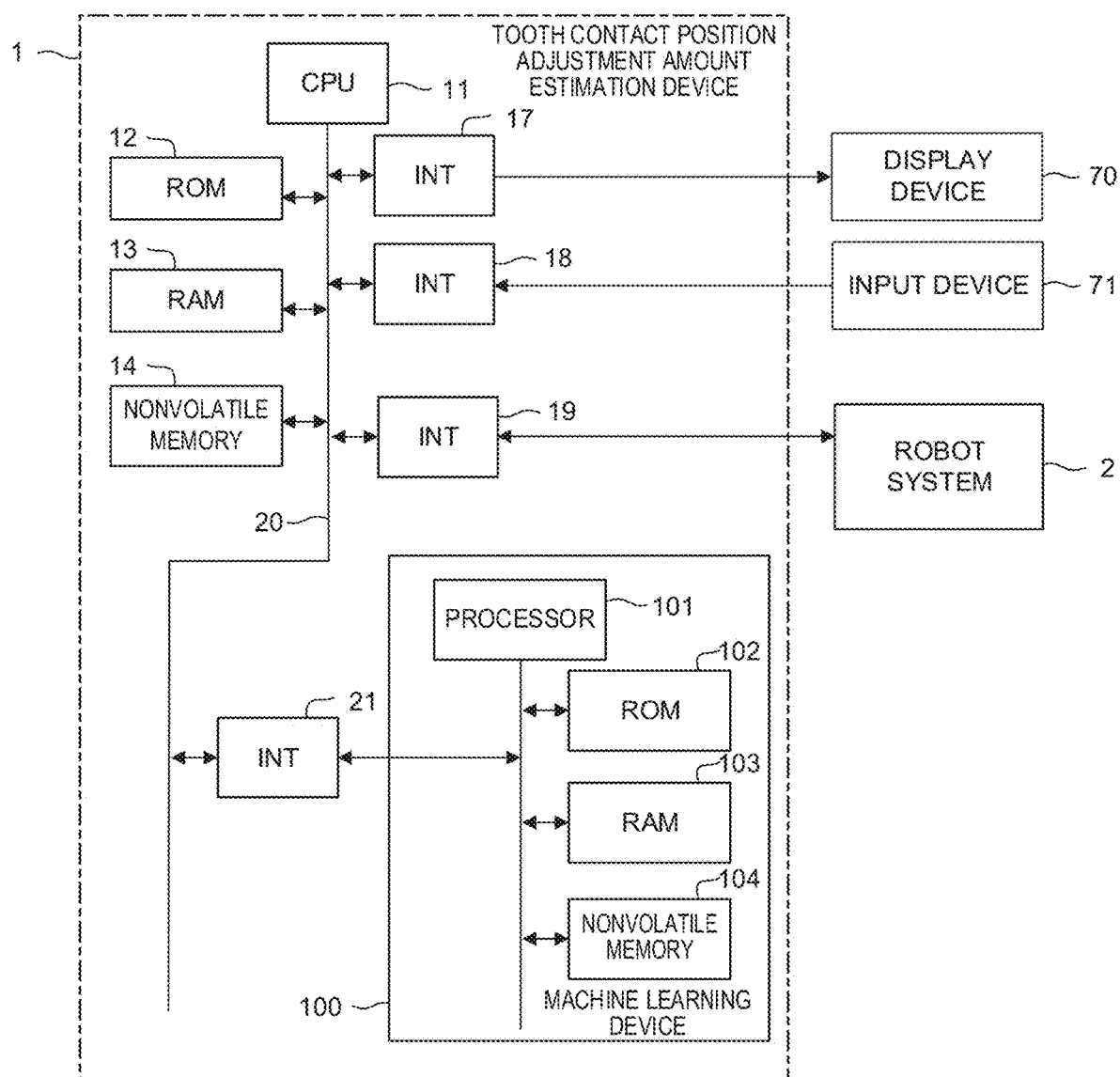
FIG. 1 is a schematic hardware configuration diagram of a tooth contact position adjustment amount estimation device according to a first embodiment.

FIG. 1 is a schematic hardware configuration diagram illustrating a tooth contact position adjustment amount estimation device 1 according to the first embodiment. The tooth contact position adjustment amount estimation device 1 is implemented on a computer such as a personal computer provided for a robot system for manufacturing a machine, or a cell computer, a host computer, an edge server, and a Cloud server which are connected to the robot system via a wired/wireless network. According to the present embodiment, the tooth contact position adjustment amount estimation device 1 is implemented on a personal computer provided for a robot system 2.

Figure 2:
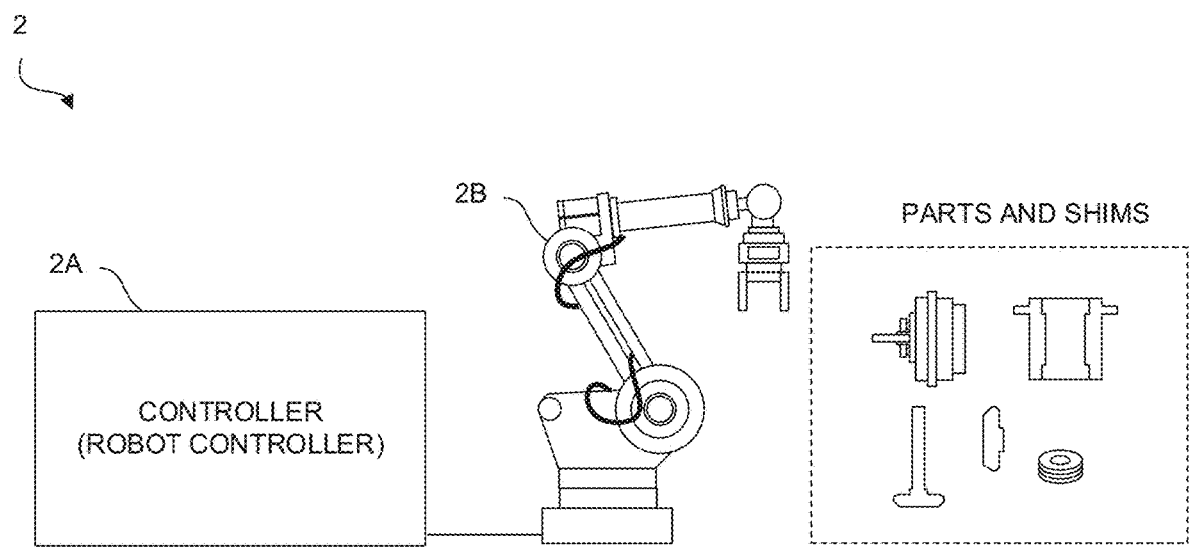
FIG. 2 is a diagram illustrating a schematic configuration of a robot system.

The tooth contact position adjustment amount estimation device 1 is connected to the robot system 2 illustrated in FIG. 2 via an interface 19. The robot system 2 includes a controller 2A and a robot 2B controlled by the controller 2A. The robot 2B assembles the parts previously supplied and arranged by a part supply device or the like thereby to assemble a power transmission mechanism. When assembling the parts, the robot system 2 assembles only the required gear adjustment shims on the parts. The tooth contact position adjustment amount estimation device 1 acquires dimensional data of the respective parts previously input into the controller 2A via the interface 19. The tooth contact position adjustment amount estimation device 1 outputs the tooth contact position adjustment amount as an estimation result to the controller 2A via the interface 19. The controller 2A determines the number of shims to be assembled on the parts or the thickness of a shim on the basis of the tooth contact position adjustment amount input from the tooth contact position adjustment amount estimation device 1. A detailed configuration of the robot system 2 for assembling a power transmission mechanism is known, and thus a detailed description thereof will be omitted in the present specification.

A central processing unit (CPU) 11 provided for the tooth contact position adjustment amount estimation device 1 is a processor for totally controlling the tooth contact position adjustment amount estimation device 1. The CPU 11 reads a system program stored in a read only memory (ROM) 12 via a bus 20. The CPU 11 controls the entire tooth contact position adjustment amount estimation device 1 according to the system program. Temporary calculation data or display data, or various items of data input by a worker from an input device 71 are temporarily stored in a random access memory (RAM) 13.

A nonvolatile memory 14 is backed up by a battery (not illustrated), for example. The nonvolatile memory 14 is a memory in which the stored states are held even if the tooth contact position adjustment amount estimation device 1 is powered off. The nonvolatile memory 14 has a setting area in which the setting information for the operations of the tooth contact position adjustment amount estimation device 1 is stored. The nonvolatile memory 14 stores the programs input from the input device 71, the programs read from an external storage device (not illustrated), or the dimensional data of the respective parts acquired from the robot system 2 via the interface 19. The programs or various items of data stored in the nonvolatile memory 14 may be loaded into the RAM 13 on execution/in use. Further, various system programs such as known analysis program (including a system program for controlling communication with a machine learning device 100 described below) are previously written in the ROM 12.

A display device 70 displays thereon each item of data read into the memory, or data acquired as a result of an executed program or the like. Data or the like output from the machine learning device 100 described below is input into the display device 70 via an interface 17. The display device 70 displays the input data or the like thereon. The input device 71 is configured of a keyboard or a pointing device. The input device 71 receives commands based on worker's operations, data, and the like. The input device 71 passes the received commands, data, and the like to the CPU 11 via an interface 18.

An interface 21 connects each part of the tooth contact position adjustment amount estimation device 1 with the machine learning device 100 in the tooth contact position adjustment amount estimation device 1. The machine learning device 100 includes a processor 101, a ROM 102, a RAM 103, and a nonvolatile memory 104. The processor 101 controls the entire machine learning device 100. The ROM 102 stores a system program and the like. The RAM 103 stores temporary data in each processing for machine learning. The nonvolatile memory 104 sores a learning model and the like. The machine learning device 100 observes each item of information (such as dimensional data of each part acquired from the robot system 2) capable of being acquired by the tooth contact position adjustment amount estimation device 1 via the interface 21. Further, the tooth contact position adjustment amount estimation device 1 causes the display device 70 to display the information on the tooth contact position adjustment amount estimated by the machine learning device 100. The tooth contact position adjustment amount estimation device 1 outputs the information on the tooth contact position adjustment amount estimated by the machine learning device 100 to the robot system 2.

Figure 3:
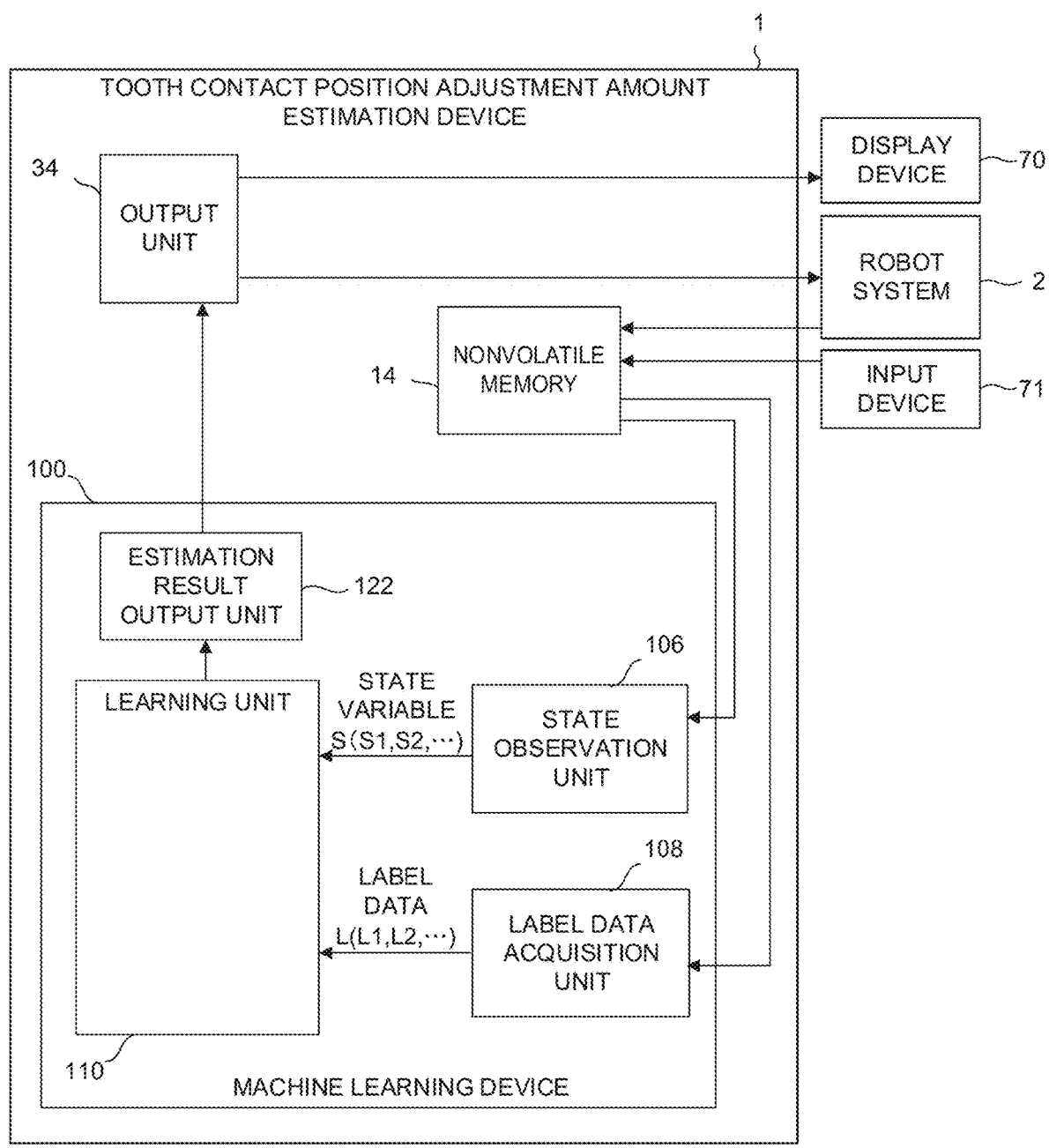
FIG. 3 is a schematic functional block diagram of the tooth contact position adjustment amount estimation device according to the first embodiment.

FIG. 3 is a schematic functional block diagram of the tooth contact position adjustment amount estimation device 1 according to the first embodiment. The CPU 11 provided for the tooth contact position adjustment amount estimation device 1 and the processor 101 of the machine learning device 100, which are illustrated in FIG. 1, execute the system programs, respectively, thereby to control the operation of each part so that each function of a functional block illustrated in FIG. 3 is realized.

The tooth contact position adjustment amount estimation device 1 includes an output unit 34 for outputting the information on the tooth contact position adjustment amount estimated by the machine learning device 100 to the outside. The output unit 34 may output the estimation result of the tooth contact position adjustment amount output from the machine learning device 100 to the display device 70, for example. The configuration is used when a worker needs to set the number of shims used for assembling a power transmission mechanism in the robot system 2, for example. Further, the output unit 34 may directly output the estimation result of the tooth contact position adjustment amount output from the machine learning device 100 to the robot system 2, for example. The configuration is used when the tooth contact position adjustment amount estimation device 1 sets the number of shims used for assembling a power transmission mechanism in the robot system 2 via a communication line.

On the other hand, the machine learning device 100 provided for the tooth contact position adjustment amount estimation device 1 performs machine learning in order to estimate the tooth contact position adjustment amount for the dimensional data of the parts constituting a power transmission mechanism assembled by the robot system 2. The machine learning device 100 includes software (such as learning algorithm) and hardware (such as the processor 101) for performing machine learning. The machine learning device 100 learns a model structure indicating a correlation between the dimensional data of the parts constituting the power transmission mechanism and the tooth contact position adjustment amount.

As illustrated in FIG. 3, the machine learning device 100 includes a state observation unit 106, a label data acquisition unit 108, a learning unit 110, and an estimation result output unit 122. The state observation unit 106 observes part dimensional data S1 indicating the dimensions of parts constituting a power transmission mechanism assembled by the robot system 2 as a status variable S indicating a current state of an environment. The label data acquisition unit 108 acquires label data L including tooth contact position adjustment amount data L1. The learning unit 110 associates and learns the dimensional data of the parts constituting the power transmission mechanism and the estimated tooth contact position adjustment amount by use of the state variable S and the label data L.

The part dimensional data S1 in the state variable S observed by the state observation unit 106 is dimensional data of the parts constituting the power transmission mechanism acquired from the robot system 2. As illustrated in FIG. 4, the dimensional data of the parts constituting the power transmission mechanism can be defined as a matrix with the dimensional data of the respective parts as elements. The dimensions of the parts are observed by use of a 3D measurement device or the like before the parts are supplied to the robot system 2. The dimensions of the parts constituting the power transmission mechanism may be measured by an image of each part previously taken by an imaging device. The measured dimensional data of the parts is stored in the memory of the robot system 2 via a network or an external device such as USB device. When the robot system 2 is provided with a sensor such as 3D measurement device or imaging device, the dimensional data of each part may be measured when the part is supplied to the robot system 2.

Figure 6:
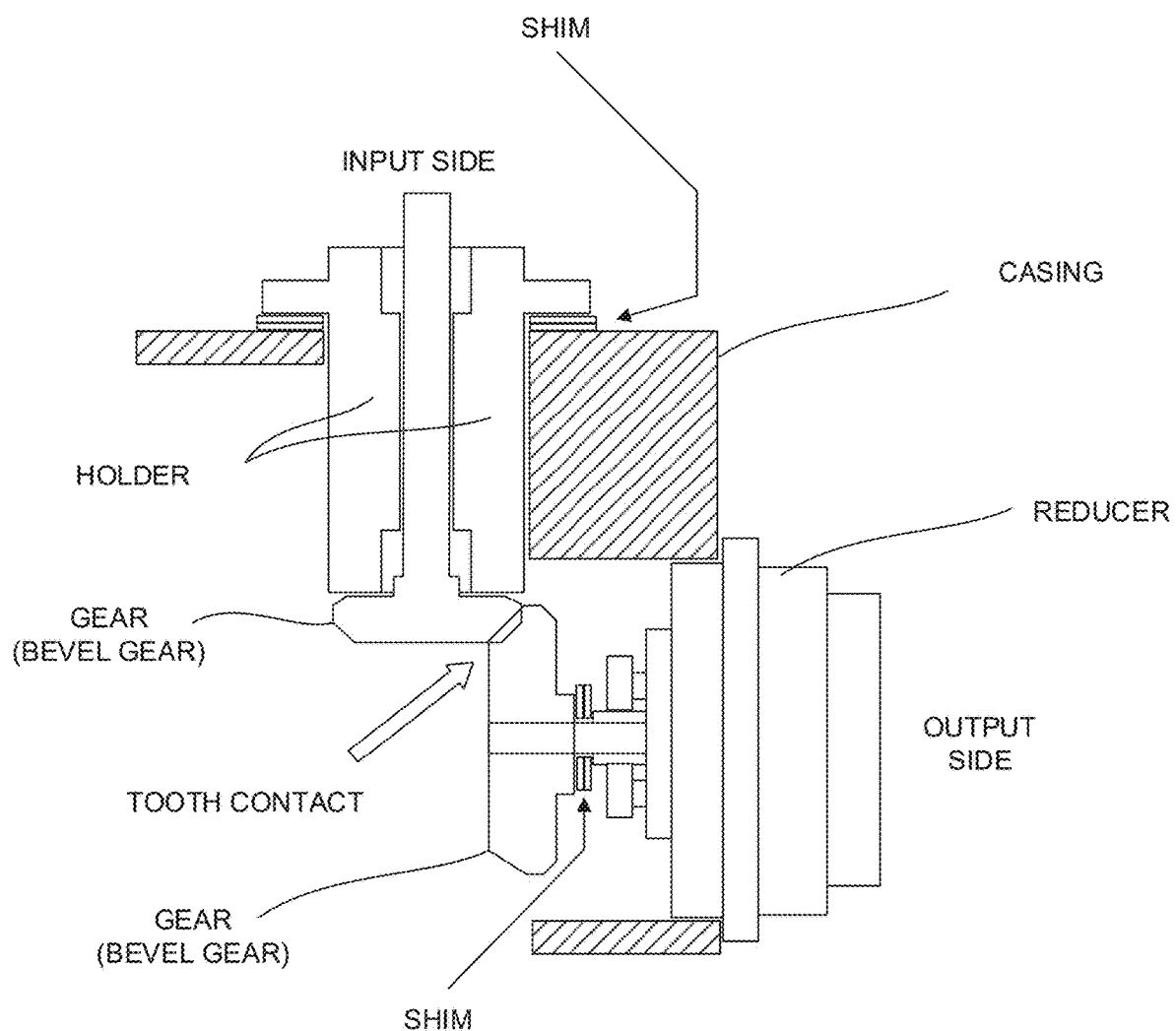
FIG. 6 is a diagram illustrating an exemplary power transmission mechanism.

The label data acquisition unit 108 acquires, as the adjustment amount data L1, the data on the tooth contact position adjustment amount acquired from the robot system 2 at the time of assembly of a power transmission mechanism during learning. The label data acquisition unit 108 may acquire, as the adjustment amount data L1, the data on the tooth contact position adjustment amount input by the worker from the input device 71. The adjustment amount data L1 may indicate a distance between a reference position for adjusting the tooth contact position and a predetermined part of the gear. Further, the adjustment amount data L1 may indicate the number of inserted shims. A plurality of items of adjustment amount data L1 may be acquired from one power transmission mechanism. For example, in the case of the power transmission mechanism illustrated in FIG. 6, the label data acquisition unit 108 acquires two adjustment amounts including the adjustment amount y1 on the input side and the adjustment amount y2 on the output side as the adjustment amount data L1. The label data acquisition unit 108 is used for learning. Thus, the label data acquisition unit 108 may not be essential for the machine learning device 100 after the learning is completed.

The learning unit 110 learns a correlation between the state variable S (the part dimensional data S1 indicating the dimensions of the parts constituting the power transmission mechanism) and the label data L (the tooth contact position adjustment amount data L1) according to any learning algorithm. For example, the learning unit 110 learns a correlation between the part dimensional data S1 included in the state variable S and the adjustment amount data L1 included in the label data L. The learning unit 110 repeatedly performs learning based on a collection of data including the state variable S and the label data L. The learning unit 110 performs machine learning by use of the adjustment amount data L1 acquired by the label data acquisition unit 108 and the part dimensional data S1 of the parts constituting the power transmission mechanism corresponding to the adjustment amount data L1.

The learning unit 110 performs machine learning online with the robot system 2. Further, the learning unit 110 may acquire the data accumulated when a power transmission mechanism is assembled by the robot system 2 via an external device such as USB device (not illustrated). That is, the learning unit may perform learning offline. In this case, after the data acquired from the external device (not illustrated) is stored in the nonvolatile memory 14, for example, the state observation unit 106 and the label data acquisition unit 108 acquire the state variable S and the label data L, respectively, from the stored data. The learning unit 110 performs machine learning on the basis of the acquired data.

The learning cycle is repeated so that the learning unit 110 automatically interprets a correlation between the dimensional data (the part dimensional data S1) of the parts constituting the power transmission mechanism and the tooth contact position adjustment amount (the adjustment amount data L1). The correlation between the part dimensional data S1 and the adjustment amount data L1 is substantially unknown at the start of the learning algorithm. The learning unit 110 gradually interprets the correlation between the part dimensional data S1 and the adjustment amount data L1 as the learning progresses. Consequently, the learning unit 110 acquires a learned model indicating the correlation between the part dimensional data S1 and the adjustment amount data L1.

The estimation result output unit 122 estimates the tooth contact position adjustment amount on the basis of the dimensional data of the parts constituting the power transmission mechanism by use of the result (learned model) learned by the learning unit 110. The estimation result output unit 122 outputs the estimated tooth contact position adjustment amount. The estimation result of the tooth contact position adjustment amount output by the estimation result output unit 122 is output to the display device 70 by the output unit 34 to be displayed thereon. The worker confirms the estimation result displayed on the display device 70, and sets the tooth contact position adjustment amount. Further, the output unit 34 may directly output the estimation result of the tooth contact position adjustment amount output by the estimation result output unit 122 to the robot system 2. In this case, the controller 2A of the robot system 2 determines the number of shims assembled for assembling the power transmission mechanism on the basis of the input estimation result of the tooth contact position adjustment amount. The controller 2A of the robot system 2 gives a control command for assembling a determined number of shims to the robot 2B. The robot 2B assembles the power transmission mechanism in response to the control command. The estimation result output unit 122 is used for estimating the tooth contact position adjustment amount. Thus, the estimation result output unit 122 may not be essential for the machine learning device 100 while only the learning unit 110 performs learning.

Figure 5:
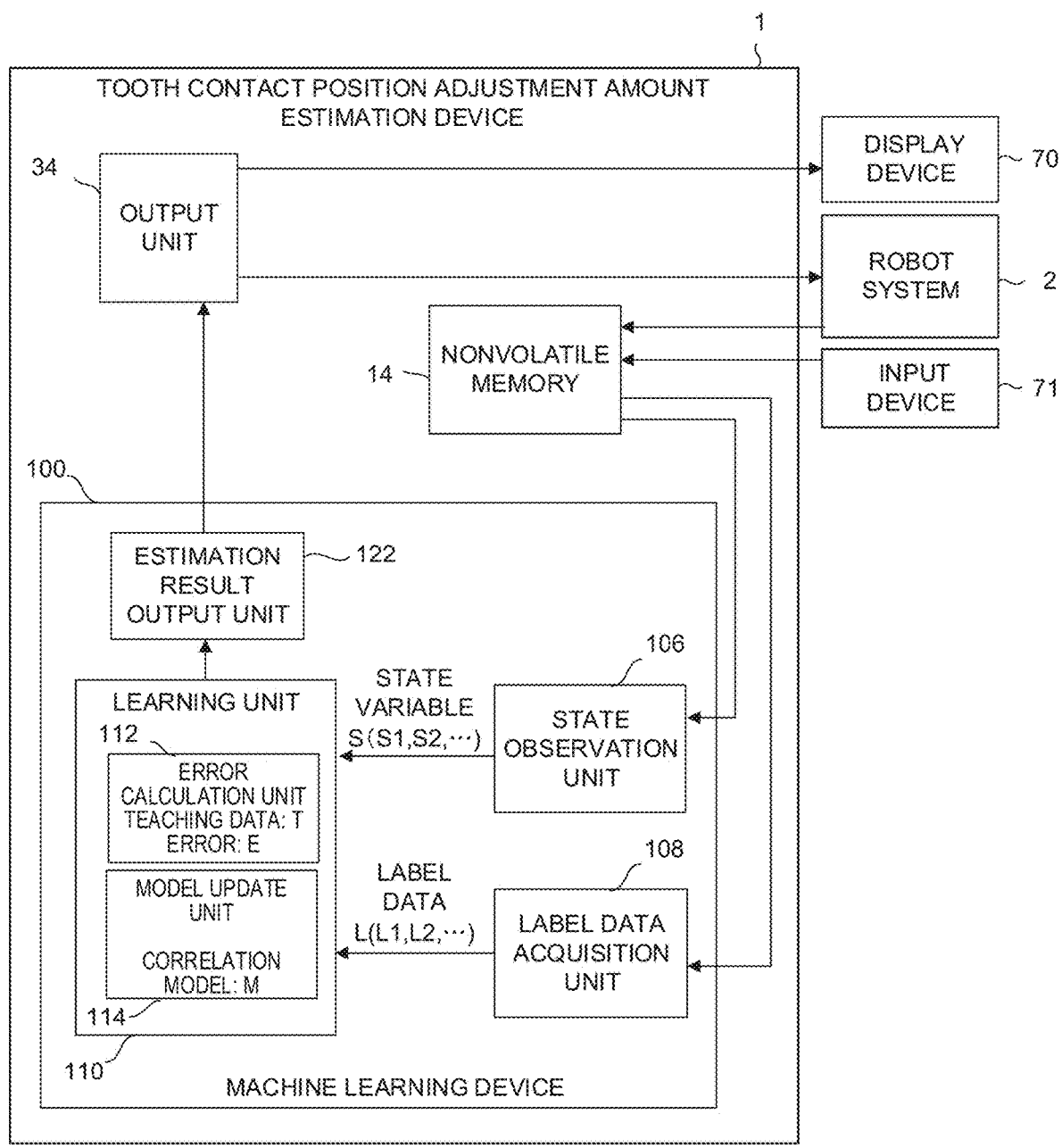
FIG. 5 is a schematic functional block diagram illustrating one form of the tooth contact position adjustment amount estimation device according to a second embodiment.

The learning algorithm executed by the learning unit 110 is not particularly limited, and a known learning algorithm is employed for machine learning. FIG. 5 illustrates a second embodiment of the tooth contact position adjustment amount estimation device 1 illustrated in FIG. 3. The learning unit 110 performs learning by use of a supervised learning algorithm. In the supervised learning, a known dataset (called teaching data) indicating an input and an output corresponding to the input is given to the learning unit 110. The teaching data is a dataset including dimensional data (input) of each of the parts acquired in the past and data (output) indicating the tooth contact position adjustment amount adjusted for each item of dimensional data, for example. The learning unit 110 identifies the characteristics indicating a correlation between the input and the output from the teaching data. Thereby, the learning unit 110 derives a correlation model for estimating an output for a new input.

The learning unit 110 includes an error calculation unit 112 and a model update unit 114. The error calculation unit 112 calculates an error E between a correlation model M for estimating the tooth contact position adjustment amount and a correlation characteristic identified by teaching data T. The model update unit 114 updates the correlation model M to reduce the error E. The model update unit 114 in the learning unit 110 repeatedly updates the correlation model M thereby to learn estimating the tooth contact position adjustment amount. That is, the learning unit 110 performs machine learning thereby to derive the correlation model M indicating the correlation between the part dimensional data and the optimum tooth contact position adjustment amount for the part dimensional data.

For example, the correlation between the state variable S and the label data L is simplified (by a linear function, for example) and expressed as the correlation model M at the start of learning. The simplified correlation model M is given to the learning unit 110 before the start of supervised learning. According to the present embodiment, the part dimensional data of the power transmission mechanism acquired in the past and the data on the tooth contact position adjustment amount are used for the teaching data T. When the tooth contact position adjustment amount estimation device 1 is operated, the teaching data T is given to the learning unit 110 regularly. The error calculation unit 112 identifies the correlation characteristics indicating the correlation between the part dimensional data of the power transmission mechanism and the tooth contact position adjustment amount by the teaching data T given to the learning unit 110. The error calculation unit 112 finds the error E between the identified correlation characteristic and the correlation model M corresponding to the state variable S and the label data L in the current state. The model update unit 114 updates the correlation model M to reduce the error E according to a predefined update rule, for example.

In the next learning cycle, the error calculation unit 112 estimates the tooth contact position adjustment amount by use of the state variable S according to the updated correlation model M. The error calculation unit 112 finds the error E between the estimation result of the tooth contact position adjustment amount and the actually-acquired label data L. The model update unit 114 updates the correlation model M to reduce the error again. In this way, the unknown correlation between the current state of the environment and the estimation therefor gradually becomes clear. That is, the correlation between the dimensional data of the parts constituting the power transmission mechanism and the tooth contact position adjustment amount data for the dimensional data gradually becomes clear.

The learning unit 110 may use a neural network for performing the supervised learning. A neural network including the three layers of input layer, middle layer, and output layer may be used as the neural network, for example. Further, the learning unit 110 may perform learning using a neural network with three or more layers, or deep learning. The learning unit 110 can perform more effective learning and estimation by use of deep learning.

A configuration of the machine learning device 100 can be described as a machine learning method (or software) performed by the processor 101. The machine learning method is to learn estimating the tooth contact position adjustment amount from the dimensional data of the parts constituting the power transmission mechanism assembled by the robot system 2, and the processor 101 executes, in the machine learning method, a step of observing the dimensional data (part dimensional data S1) of the parts constituting the power transmission mechanism assembled by the robot system 2 as a state variable S indicating a current state, a step of acquiring the tooth contact position adjustment amount (adjustment amount data L1) as label data L, and a step of associating and learning the dimensional data of the parts constituting the power transmission mechanism assembled by the robot system 2 and the tooth contact position adjustment amount by use of the state variable S and the label data L.

Figure 7:
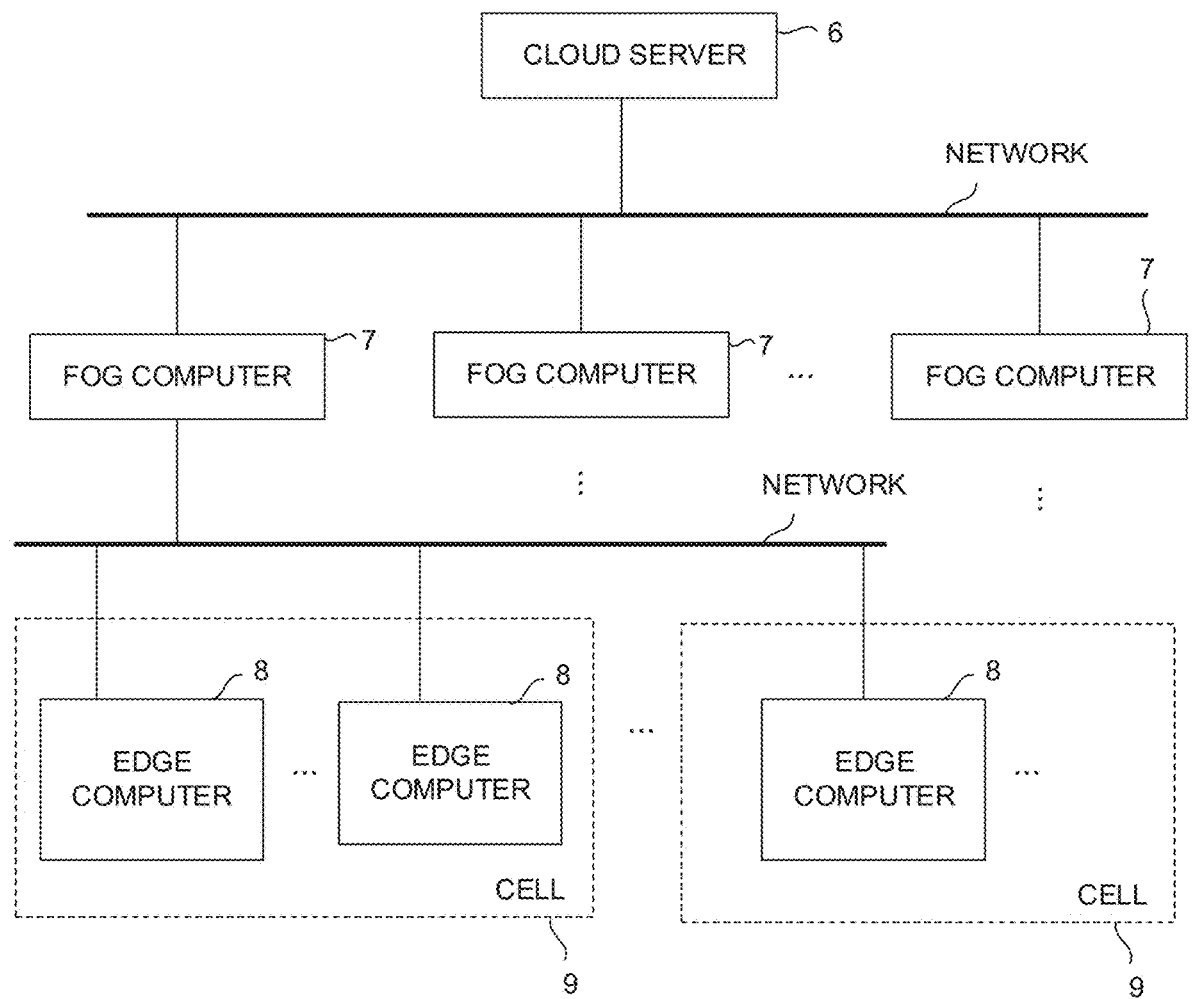
FIG. 7 is a diagram illustrating an exemplary system of three-layer structure including a cloud server, a fog computer and an edge computer.

In third to fifth embodiments described below, description is made to the case in which the tooth contact position adjustment amount estimation device 1 according to the first and second embodiments is implemented as a part of a system in which the tooth contact position adjustment amount estimation device 1 is connected via a wired/wireless network to a plurality of devices such as a cloud server, a host computer, a fog computer, and an edge computer (robot controller, controller, and so forth). As exemplarily depicted in FIG. 7, in the following third to fifth embodiments, each of a plurality of devices is configured to be logically divided into three layers, that is, a layer including a cloud server 6 and so forth, a layer including fog computers 7 and so forth, and a layer including edge computers 8 (robot controller included in a cell 9, controller, and so forth) and so forth, with each of the plurality of devices connected to the network. In the system as described above, the tooth contact position adjustment amount estimation device 1 can be implemented on any of the cloud server 6, the fog computers 7, and the edge computers 8. The tooth contact position adjustment amount estimation device 1 can share learning data used in processing with respect to machine learning among the plurality of devices via the network and can execute distributed learning, for example. The tooth contact position adjustment amount estimation device 1 can collect the generated learning model in the fog computers 7 or the cloud server 6 for large-scale analysis. Furthermore, the tooth contact position adjustment amount estimation device 1 can mutually reuse the generated learning model. In a system exemplarily depicted in FIG. 7, a plurality of cells 9 are provided to each factory at many places. The fog computers 7 which is the upper layer on the cell 9 manage the respective cells 9 in predetermined units (such as by factory or by a plurality of factories of the same manufacturer). The cloud server 6 which is the upper layer on the fog computer 7 then collects and analyze data collected and analyzed by these fog computers 7. The resultant information by analyzing can be utilized for control and so forth of each edge computer.

Figure 8:
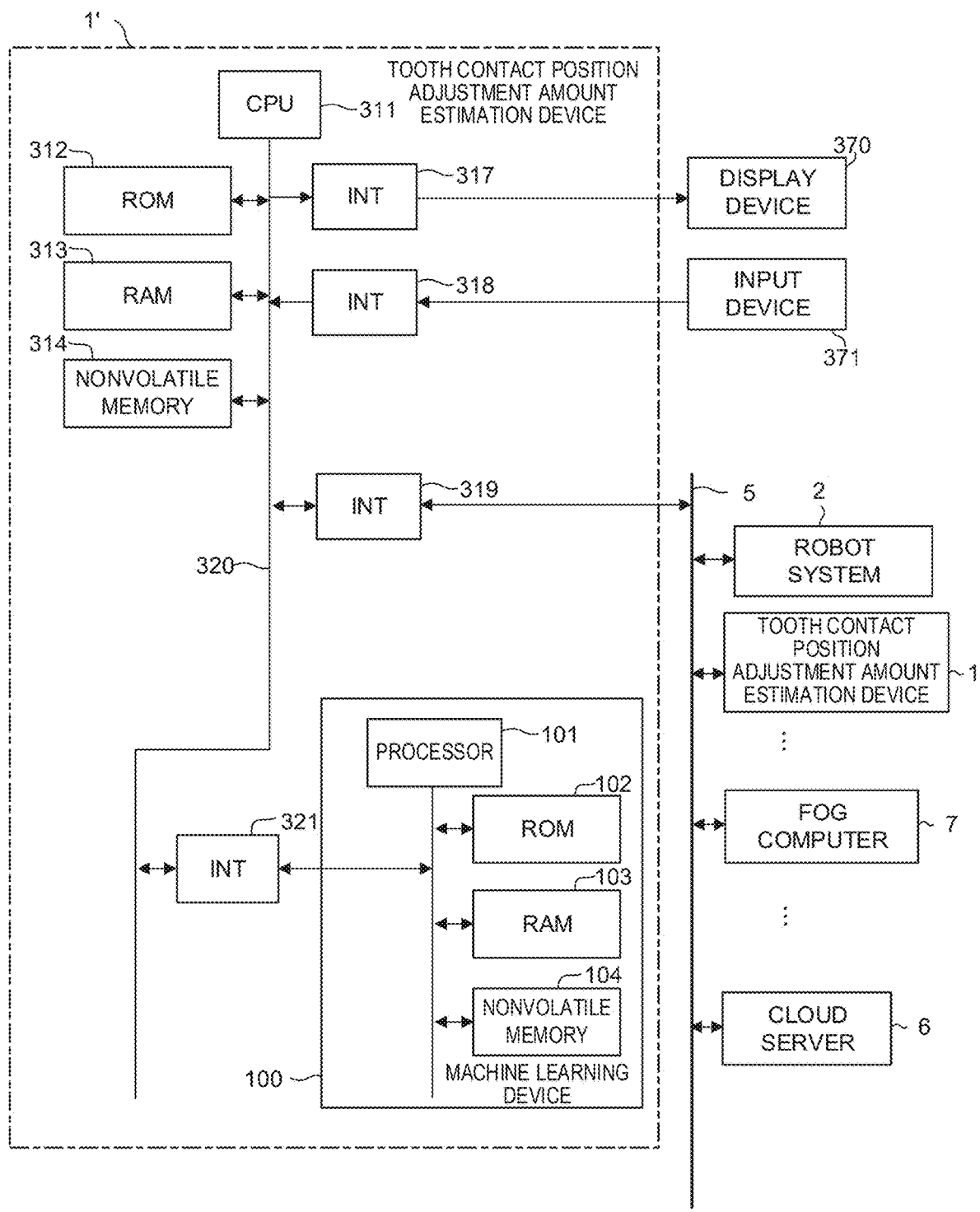
FIG. 8 is a schematic hardware configuration diagram of a tooth contact position adjustment amount estimation device implemented on a computer.

FIG. 8 is a schematic hardware configuration diagram illustrating a tooth contact position adjustment amount estimation device 1 implemented on a computer such as a cloud server, a fog computer and so forth.

A central processing unit (CPU) 311 provided for the tooth contact position adjustment amount estimation device 1' implemented on a computer according to this embodiment is a processor for totally controlling the tooth contact position adjustment amount estimation device 1'. The CPU 311 reads a system program stored in a read only memory (ROM) 312 via a bus 320. The CPU 311 controls the entire tooth contact position adjustment amount estimation device 1' according to the system program. Temporary calculation data or display data, or various items of data input by a worker from an input device 371 are temporarily stored in a random access memory (RAM) 313.

A nonvolatile memory 314 is backed up by a battery (not illustrated), for example. The nonvolatile memory 314 is a memory in which the stored states are held even if the tooth contact position adjustment amount estimation device 1' is powered off. The nonvolatile memory 314 stores the programs input from the input device 371. The nonvolatile memory 314 stores various items of data acquired from the robot system 2 and the like via each part of the tooth contact position adjustment amount estimation device 1' or a network 5. The programs or various items of data stored in the nonvolatile memory 14 may be loaded into the RAM 313 on execution/in use. Further, various system programs such as known analysis program (including a system program for controlling communication with a machine learning device 100 described below) are previously written in the ROM 312.

The tooth contact position adjustment amount estimation device 1' is connected to a wired/wireless network 5 via an interface 319. At least one robot system 2, another tooth contact position adjustment amount estimation device 1, an edge computer 8, a fog computer 7, a cloud server 6 and so forth are connected to the network 5. These devices connected to the network 5 mutually exchange data with the tooth contact position adjustment amount estimation device 1'.

A display device 370 displays thereon each item of data read into the memory, or data acquired as a result of an executed program or the like, which are output via an interface 317. The input device 371 is configured of a keyboard or a pointing device. The input device 371 passes commands based on worker's operations, data, and the like to the CPU 311 via an interface 318.

An interface 321 is an interface which connects each part of the tooth contact position adjustment amount estimation device 1' with the machine learning device 100. The machine learning device 100 has the same configuration as that described in FIG. 1.

As described above, in a case where the tooth contact position adjustment amount estimation device 1' is implemented on a computer such as a cloud server and a fog computer, functions provided with the tooth contact position adjustment amount estimation device 1' are the same as the functions described in the first and the second embodiments, except that information from the robot system 2 and commands for setting a tooth contact position adjustment amount to the robot system are exchanged vie a network 5.

Figure 9:
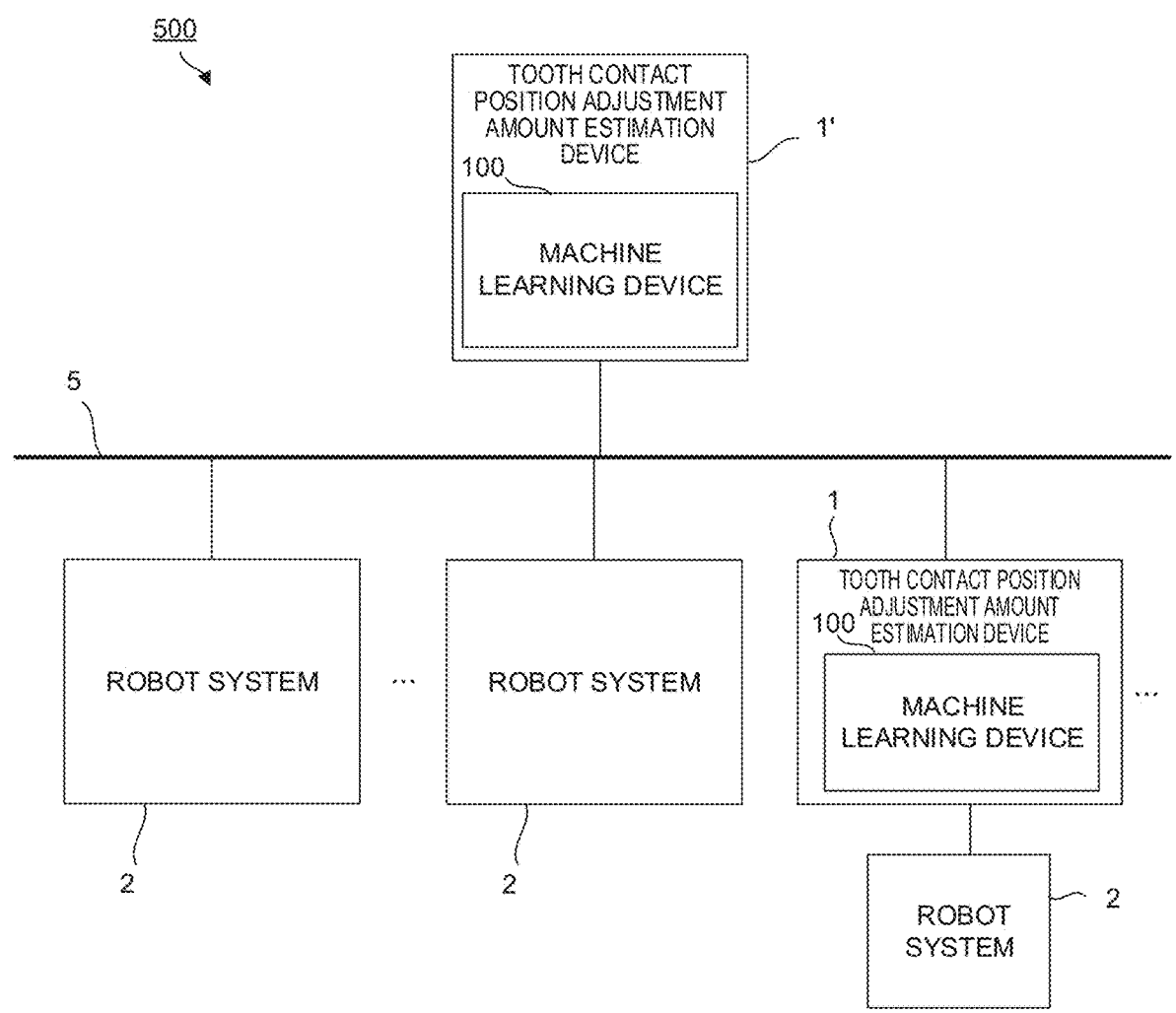
FIG. 9 is a schematic configuration diagram of a tooth contact position adjustment amount estimation device according to a third embodiment.

FIG. 9 is a schematic hardware configuration diagram according to the third embodiment illustrating a tooth contact position adjustment amount estimation system provided with the tooth contact position adjustment amount estimation device 1'. A tooth contact position adjustment amount estimation system 500 is provided with a plurality of tooth contact position adjustment amount estimation devices 1, 1', a plurality of robot systems 2 and a network 5 connecting the plurality of tooth contact position adjustment amount estimation devices 1, 1' and the plurality of robot systems 2.

In the tooth contact position adjustment amount estimation system 500, the tooth contact position adjustment amount estimation device 1' provided with a machine learning device 100 estimates tooth contact position adjustment amount in assembling a power transmission mechanism by the robot system 2 using a learning result by the learning unit 110. At least one tooth contact position adjustment amount estimation device 1' learns the tooth contact position adjustment amount, which is common to all of the tooth contact position adjustment amount estimation devices 1, 1', in assembling a power transmission mechanism by the robot system 2 based on a state variable and label data acquired by each of the plurality of the other tooth contact position adjustment amount estimation devices 1, 1'. The tooth contact position adjustment amount estimation device 1' is configured to share the learning result among all of the tooth contact position adjustment amount estimation devices 1, 1'. Therefore, according to the tooth contact position adjustment amount estimation system 500 can improve speed and reliability of the learning using a various collection of data (including the state variable S and label data L) as an input.

Figure 10:
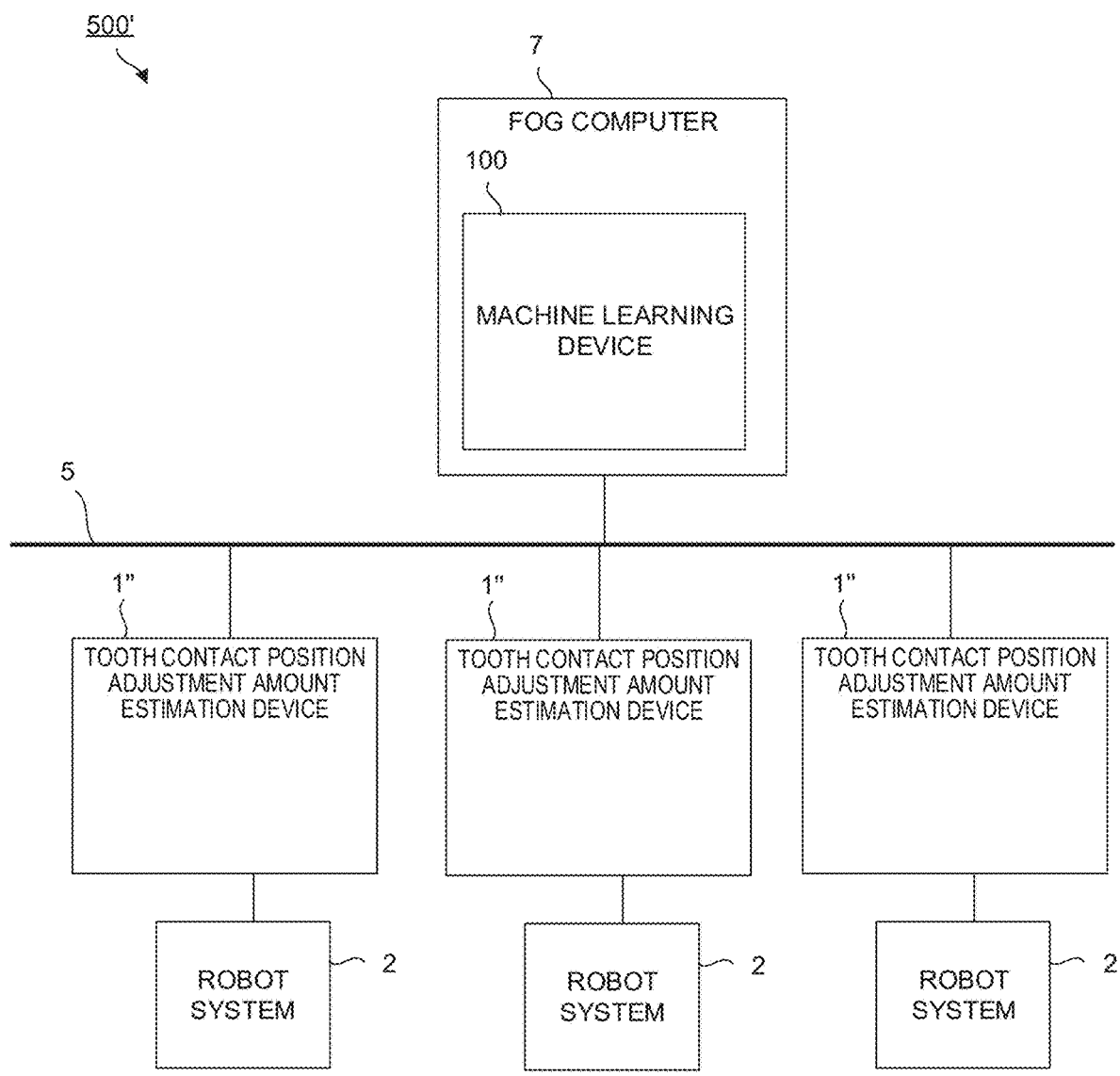
FIG. 10 is a schematic configuration diagram of a tooth contact position adjustment amount estimation device according to a fourth embodiment.

FIG. 10 is a schematic configuration diagram according to the fourth embodiment illustrating a system in which a machine learning device and a tooth contact position adjustment amount estimation device are implemented on different devices. A tooth contact position adjustment amount estimation system 500' includes at least one machine learning device 100 implemented on a part of a computer such as a cloud server, a host computer, a fog computer and so forth (FIG. 10 illustrates an example of a machine learning device 100 implemented as a part of a fog computer 7) and a plurality of tooth contact position adjustment amount estimation devices 1". Further, the tooth contact position adjustment amount estimation system 500' is provided with a network 5 connecting the plurality of tooth contact position adjustment amount estimation devices 1" and a computer. Hardware configuration of the computer is the same as schematic hardware configuration of the tooth contact position adjustment amount estimation devices 1' described in FIG. 8 in which hardware such as a CPU 311, a RAM 313 and a nonvolatile memory 314 provided for a general computer is connected with each other via a bus 320.

In the above-structured tooth contact position adjustment amount estimation system 500', based on the state variable S and the label data L acquired for each of the plurality of tooth contact position adjustment amount estimation devices 1", the machine learning device 100 of the tooth contact position adjustment amount estimation system 500' learns the tooth contact position adjustment amount, which is common to all the tooth contact position adjustment amount estimation devices 1", in assembling a power transmission mechanism by the robot system 2. The tooth contact position adjustment amount estimation system 500', using the learning result, can adjust the tooth contact position adjustment amount in assembling a power transmission mechanism by the robot system 2. According to the tooth contact position adjustment amount estimation system 500' with respect to the embodiment, each of the required number of the tooth contact position adjustment amount estimation devices 1" can be connected to the machine learning device 100 when necessary regardless of existing place or time.

Figure 11:
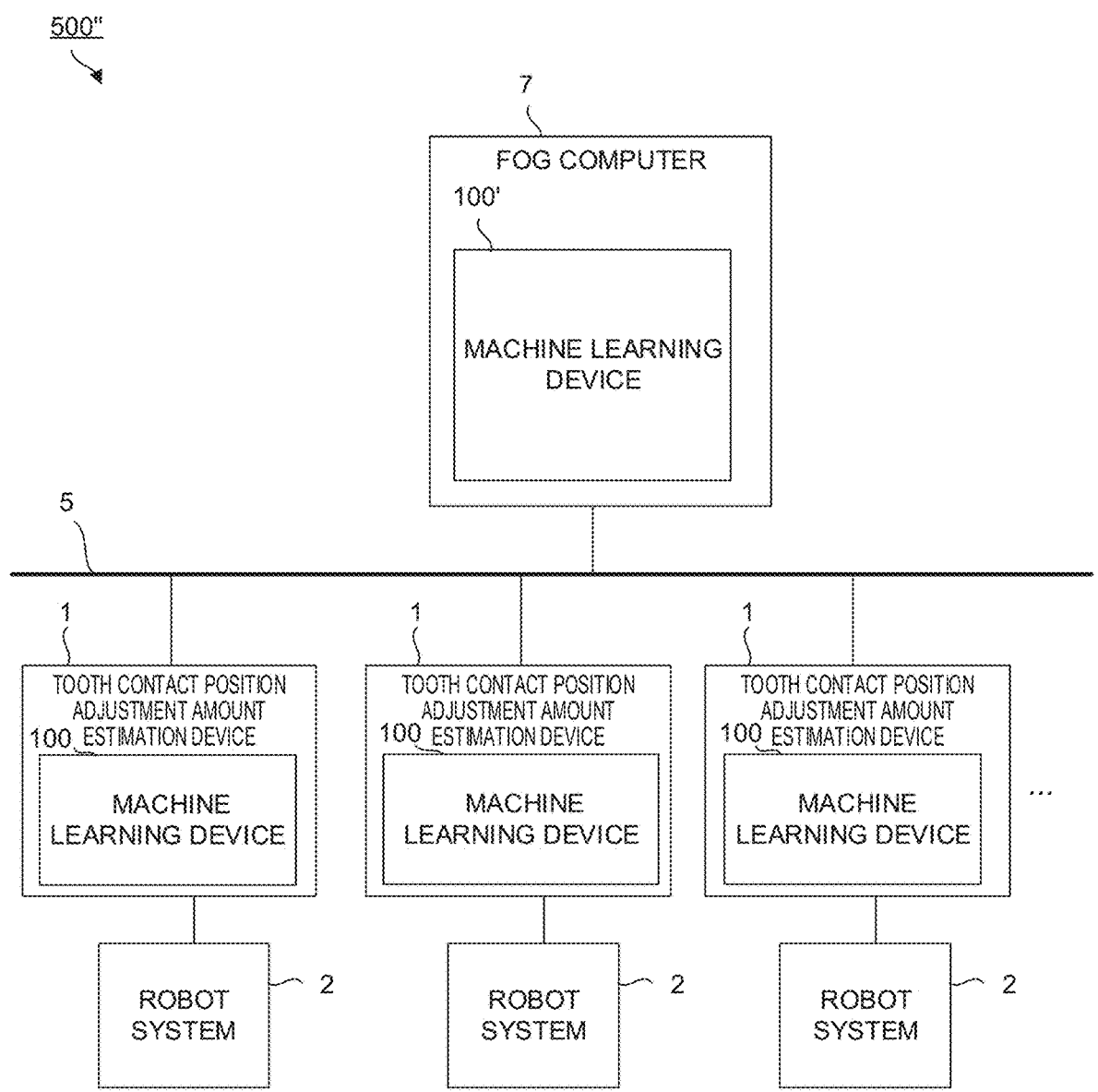
FIG. 11 is a schematic configuration diagram of a tooth contact position adjustment amount estimation device according to a fifth embodiment.

FIG. 11 is a schematic configuration diagram according to the fifth embodiment illustrating a tooth contact position adjustment amount estimation system 500" provided with a machine learning device 100' and a tooth contact position adjustment amount estimation device 1. A tooth contact position adjustment amount estimation system 500" is provided with at least one machine learning device 100 implemented on a computer such as an edge computer, a fog computer, host computer and a cloud server (FIG. 11 illustrates an example of a machine learning device 100 implemented as a part of a fog computer 7) and a plurality of tooth contact position adjustment amount estimation devices 1. Further, the tooth contact position adjustment amount estimation system 500" is provided with a wired/wireless network 5 connecting the tooth contact position adjustment amount estimation devices 1 and the computer. In the above-structured tooth contact position adjustment amount estimation system 500", the fog computer 7 provided with the machine learning device 100' acquires, from each of the tooth contact position adjustment amount estimation devices 1, learning models acquired as a result of machine learning by the machine learning device 100' included in the tooth contact position adjustment amount estimation devices 1. The machine learning device 100' included in the fog computer 7 then optimizes knowledge and performs processing for enhancing efficiency based on the plurality of these learning models to generate new optimized, efficiency-enhanced learning models. The machine learning device 100' distributes the generated learning models to the each of the tooth contact position adjustment amount estimation devices 1.

An example of optimization or efficiency enhancement of learning models performed by the machine learning device 100' is generation of a distilled model based on a plurality of learning models acquired from each of the tooth contact position adjustment amount estimation devices 1. The machine learning device 100' according to the present embodiment generates input data to be inputted to the learning models and then learns by using an output acquired as a result of inputting the input data to each learning model, thereby generating a new learning model (distilled model). As described above, thus generated distilled model is distributed to an external storage medium, or distributed to the tooth contact position adjustment amount estimation devices 1 and other computers via a network and utilized.

Another example of optimization or efficiency enhancement of learning models performed by the machine learning device 100' can be as follows. First, in the course of performing distillation on a plurality of learning models acquired from each of the tooth contact position adjustment amount estimation devices 1, an output data distribution of each learning model for input data is analyzed by a general statistical scheme. Next, outliers of sets of input data and output data are extracted. Next, distillation is performed by using sets of input data and output data except the outliers. By undergoing this course, exceptional estimation results are excluded from the sets of input data and output data acquired from each learning model. Namely, a distilled model can be generated by using the sets of input data and output data with the exceptional estimation results excluded. A distilled model generated in this manner can more generally be utilized compared with a learning model generated in a plurality of the tooth contact position adjustment amount estimation devices 1.

Note that any of other general schemes of optimization or efficiency enhancement of learning models (such as analyzing each learning model and optimizing a hyperparameter of the learning models based on the analysis result) can be introduced as appropriate.

In the tooth contact position adjustment amount estimation system 500" according to the present embodiment, the machine learning device 100' is arranged on a fog computer 7 installed for a plurality of the tooth contact position adjustment amount estimation devices 1 as edge computers. Learning models generated by the tooth contact position adjustment amount estimation devices 1 are collectively stored in the fog computer 7. Optimization and enhancement of efficiency are performed based on the plurality of stored learning models, and then the optimized, efficiency-enhanced learning models can be re-distributed to each of the tooth contact position adjustment amount estimation devices 1 as required.

Also, in the tooth contact position adjustment amount estimation system 500" according to the present embodiment, for example, learning models collectively stored on the fog computer 7 and learning models optimized or efficiency-enhanced on the fog computer 7 can be collected onto a further upper host computer or cloud server. In this case, by using these learning models, application to intellectual tasks at factories or the manufacturer of the tooth contact position adjustment amount estimation devices 1 can be made (such as construction and re-distribution of further versatile learning models at an upper server, support for maintenance based on the result of analysis on the learning models, analysis on performance of each of the tooth contact position adjustment amount estimation devices 1 and others, and application to new machine development).

The embodiments of the present invention have been described above, but the present invention is not limited to the above embodiments, and can be changed as needed to be implemented in various aspects.

For example, the learning algorithm or calculation algorithm executed by the machine learning device 100, the control algorithm executed by the tooth contact position adjustment amount estimation device 1, and the like are not limited to the above ones, and various algorithms may be employed.

Further, the tooth contact position adjustment amount estimation device 1 and the machine learning device 100 have the different CPUs, respectively, in the above embodiments, but the machine learning device 100 may be realized by the CPU 11 provided for the tooth contact position adjustment amount estimation device 1 and the system program stored in the ROM 12.

The invention claimed is:

1. A tooth contact position adjustment amount estimation device configured to perform processing with respect to estimating a tooth contact position adjustment amount for dimensional data of parts constituting a power transmission mechanism, the tooth contact position adjustment amount estimation device comprising:
 a machine learning device configured to perform processing with respect to estimating the tooth contact position adjustment amount for the dimensional data of parts constituting the power transmission mechanism, a tooth contact between the parts changing due to a dimensional error of the parts, wherein the machine learning device is configured to
 observe part dimensional data, which is the dimensional data of the parts constituting the power transmission mechanism, as a state variable indicating a current state of an environment, before the parts are supplied to assemble the power transmission mechanism,
 store the observed part dimensional data in a memory, and
 perform processing with respect to estimating the tooth contact position adjustment amount for the dimensional data of the parts constituting the power transmission mechanism before the power transmission mechanism is assembled, by performing processing with respect to machine learning based on the state variable observed and stored in the memory before the parts are supplied.

2. The tooth contact position adjustment amount estimation device according to claim 1, wherein the machine learning device comprises:
 a state observation unit configured to observe the part dimensional data, which is dimensional data of parts constituting the power transmission mechanism, as the state variable indicating the current state of the environment;
 a label data acquisition unit configured to acquire tooth contact position adjustment amount data adjusted in assembling the power transmission mechanism as label data; and
 a learning unit configured to learn the tooth contact position adjustment amount in assembling the power transmission mechanism for the dimensional data of parts constituting the power transmission mechanism by use of the state variable and the label data.

3. The tooth contact position adjustment amount estimation device according to claim 2, wherein the learning unit comprises:
 an error calculation unit configured to calculate an error between a correlation model for estimating the tooth contact position adjustment amount in assembling the power transmission mechanism from the state variable and a correlation characteristic identified by previously-prepared teaching data; and
 a model update unit configured to update the correlation model to reduce the error.

4. The tooth contact position adjustment amount estimation device according to claim 2, wherein the learning unit is configured to calculate the state variable and the label data in a multilayered structure.

5. The tooth contact position adjustment amount estimation device according to claim 1,
 wherein the machine learning device comprises:
 a state observation unit configured to observe part dimensional data as dimensional data of parts constituting a power transmission mechanism as a state variable indicating a current state of an environment;
 a learning unit that has learned a tooth contact position adjustment amount in assembling a power transmission mechanism for dimensional data of parts constituting the power transmission mechanism; and
 an estimation result output unit configured to estimate and output a tooth contact position adjustment amount in assembling a power transmission mechanism on the basis of a state variable observed by the state observation unit and a learning result by the learning unit.

6. A machine learning device configured to perform processing with respect to estimating a tooth contact position adjustment amount for dimensional data of parts constituting a power transmission mechanism, wherein the machine learning device is configured to
 observe part dimensional data, which is the dimensional data of the parts constituting the power transmission mechanism, as a state variable indicating a current state of an environment, before the parts are supplied to assemble the power transmission mechanism,
 store the observed part dimensional data in a memory, and
 perform processing with respect to estimating the tooth contact position adjustment amount for the dimensional data of the parts constituting the power transmission mechanism before the parts are assembled into the power transmission mechanism, by performing processing with respect to machine learning based on the state variable observed and stored in the memory before the parts are supplied, wherein a tooth contact between the parts changes due to a dimensional error of the parts.

7. The machine learning device according to claim 6, further comprising:

a state observation unit configured to observe the part dimensional data as the dimensional data of parts constituting the power transmission mechanism as the state variable indicating the current state of the environment;

a label data acquisition unit configured to acquire the tooth contact position adjustment amount data adjusted in assembling the power transmission mechanism as the label data; and a learning unit configured to learn the tooth contact position adjustment amount in assembling the power transmission mechanism for the dimensional data of parts constituting the power transmission mechanism by use of the state variable and the label data.

8. A machine learning device according to claim 6, further comprising:

a state observation unit configured to observe the part dimensional data as the dimensional data of parts constituting the power transmission mechanism as the state variable indicating the current state of the environment;

a learning unit that has learned the tooth contact position adjustment amount in assembling the power transmission mechanism for the dimensional data of parts constituting the power transmission mechanism; and an estimation result output unit configured to estimate and output the tooth contact position adjustment amount in assembling the power transmission mechanism on the basis of the state variable observed by the state observation unit and a learning result by the learning unit.

9. A robot system, comprising:

a robot; and a controller configured to on the basis of the tooth contact position adjustment amount estimated by the tooth contact position adjustment amount estimation device according to claim 5, determine a number of shims to be used for assembling the power transmission mechanism from the parts, and instruct the robot to insert the determined number of shims between the parts to obtain the power transmission mechanism.

10. A tooth contact position adjustment amount estimation system, comprising:

a plurality of devices connected to each other via a network, wherein the plurality of devices include at least one tooth contact position adjustment amount estimation device according to claim 2, and the at least one tooth contact position adjustment amount estimation device comprises a first tooth contact position adjustment amount estimation device.

11. The tooth contact position adjustment amount estimation system according to claim 10, wherein the plurality of devices include a computer provided with a machine learning device, the computer is configured to acquire a learning model as at least one of results of learning by the first tooth contact position adjustment amount estimation device, and the machine learning device is configured to perform optimization or efficiency enhancement based on the learning model.

12. The tooth contact position adjustment amount estimation system according to claim 10, wherein the at least one tooth contact position adjustment amount estimation device further comprises a second tooth contact position adjustment amount estimation device different from the first tooth contact position adjustment amount estimation device, and the first tooth contact position adjustment amount estimation device is configured to share a result of learning with the second tooth contact position adjustment amount estimation device.

13. The tooth contact position adjustment amount estimation system according to claim 10, wherein the at least one tooth contact position adjustment amount estimation device further comprises a second tooth contact position adjustment amount estimation device different from the first tooth contact position adjustment amount estimation device, and the second tooth contact position adjustment amount estimation device is configured to provide, via the network, data observed in the second tooth contact position adjustment amount estimation device to be used for in the first tooth contact position adjustment amount estimation device.

14. The tooth contact position adjustment amount estimation device according to claim 1, wherein the parts constituting the power transmission mechanism include a first part having a first teeth and a second part having a second teeth engageable with the first teeth of the first part in assembling the power transmission mechanism, and the tooth contact position is a relative contact position between the first teeth of the first part and the second teeth of the second part when the first teeth engages with the second teeth.

15. The tooth contact position adjustment amount estimation device according to claim 14, wherein an axial line of the first part and an axial line of the second part are arranged at a right angle.

16. The machine learning device according to claim 6, wherein the parts constituting the power transmission mechanism include a first part having a first teeth and a second part having a second teeth engageable with the first teeth of the first part in assembling the power transmission mechanism, and the tooth contact position is a relative contact position between the first teeth of the first part and the second teeth of the second part when the first teeth engages with the second teeth.

17. The machine learning device according to claim 16, wherein an axial line of the first part and an axial line of the second part are arranged at a right angle.

18. The tooth contact position adjustment amount estimation device according to claim 1, wherein the parts constituting the power transmission mechanism include a first bevel gear with a first axial line and a second bevel gear with a second axial line, and the first axial line and the second axial line are arranged at a right angle when the first and the second bevel gears are assembled in the power transmission mechanism.

19. The machine learning device according to claim 6, wherein the parts constituting the power transmission mechanism include a first bevel gear with a first axial line and a second bevel gear with a second axial line, and the first axial line and the second axial line are arranged at a right angle when the first and the second bevel gears are assembled in the power transmission mechanism.

20. The tooth contact position adjustment amount estimation device according to claim 1, wherein the tooth contact position adjustment amount determines, before assembling the power transmission mechanism, a number of shims to be inserted between the parts when the power transmission mechanism is assembled from the parts.

* * * * *